(12) United States Patent  (10) Patent No.: US 8,079,743 B2
Bailey et al.  (45) Date of Patent: Dec. 20, 2011

(54) DISPLAY BACKLIGHT WITH IMPROVED LIGHT COUPLING AND MIXING

(75) Inventors: Edward Bailey, Westampton, NJ (US); Joseph B. Mazzochette, Cherry Hill, NJ (US); Andrew Beregszaszi, Philadelphia, PA (US); Robert J Burdalski, Lumberton, NJ (US)

(73) Assignee: Lighting Science Group Corporation, Satellite Beach, FL (US)

( * ) Notice: Subject to any disclaimer, the term of this patent is extended or adjusted under 35 U.S.C. 154(b) by 145 days.

(21) Appl. No.: 11/474,187

(22) Filed: Jun. 23, 2006

(65) Prior Publication Data

US 2007/0081360 A1    Apr. 12, 2007

Related U.S. Application Data

(60) Provisional application No. 60/694,740, filed on Jun. 28, 2005.

(51) Int. Cl.
*H01R 33/00* (2006.01)

(52) U.S. Cl. ........ 362/608; 362/609; 362/610; 362/621; 362/612; 362/555

(58) Field of Classification Search .......... 362/608–610, 362/612–613, 621–622, 555; 385/42, 43, 385/88, 89, 92, 14, 76, 77, 78, 80, 901; 349/64
See application file for complete search history.

(56) References Cited

U.S. PATENT DOCUMENTS

| | | | |
|---|---|---|---|
| 4,903,172 A * | 2/1990 | Schoniger et al. | 362/612 |
| 5,050,946 A * | 9/1991 | Hathaway et al. | 385/33 |
| 5,217,811 A * | 6/1993 | Filas et al. | 428/447 |
| 5,581,876 A | 12/1996 | Prabhu et al. | |
| 5,725,808 A | 3/1998 | Tormey et al. | |
| 5,883,684 A * | 3/1999 | Millikan et al. | 349/65 |
| 5,953,203 A | 9/1999 | Tormey et al. | |
| 6,270,831 B2 | 8/2001 | Kumar et al. | |
| 6,274,890 B1 * | 8/2001 | Oshio et al. | 257/98 |
| 6,455,930 B1 | 9/2002 | Palanisamy et al. | |
| 6,518,502 B2 | 2/2003 | Hammond et al. | |
| 6,536,909 B1 | 3/2003 | Azorin | |
| 6,805,456 B2 | 10/2004 | Okuwaki | |
| 6,854,854 B2 | 2/2005 | Hoelen et al. | |
| 7,098,483 B2 | 8/2006 | Mazzochette et al. | |
| 7,163,331 B2 * | 1/2007 | Suzuki et al. | 362/610 |
| 7,172,319 B2 * | 2/2007 | Holder et al. | 362/341 |
| 7,217,025 B2 * | 5/2007 | Kim et al. | 362/610 |
| 7,235,817 B2 * | 6/2007 | Yano et al. | 257/98 |
| 7,293,906 B2 * | 11/2007 | Mok et al. | 362/609 |
| 2003/0049007 A1 * | 3/2003 | Sommers et al. | 385/129 |
| 2003/0219207 A1 * | 11/2003 | Guy | 385/49 |
| 2004/0043693 A1 | 3/2004 | Ohkubo et al. | |

(Continued)

FOREIGN PATENT DOCUMENTS

WO    WO 2005015646 A1 *    2/2005

(Continued)

*Primary Examiner* — Robert May
(74) *Attorney, Agent, or Firm* — Cantor Colburn LLP

(57) ABSTRACT

A display backlight assembly providing improved optical coupling between a solid state light source and a display optical light guide. The assembly includes an optical coupler to couple the solid state light source and display optical light guide together. In addition, the optical coupler may include a light mixing element for improved mixing of the multi-colored or mono-chromatic light produced by the solid state light source.

58 Claims, 10 Drawing Sheets

U.S. PATENT DOCUMENTS

| | | | |
|---|---|---|---|
| 2004/0066645 A1* | 4/2004 | Graf et al. | 362/31 |
| 2004/0071437 A1* | 4/2004 | Tamura et al. | 385/146 |
| 2004/0109306 A1 | 6/2004 | Lee | |
| 2004/0246744 A1* | 12/2004 | Krupa et al. | 362/574 |
| 2005/0007756 A1 | 1/2005 | Yu et al. | |
| 2005/0063187 A1 | 3/2005 | Weng et al. | |
| 2005/0093146 A1 | 5/2005 | Sakano | |
| 2005/0121686 A1 | 6/2005 | Keller et al. | |
| 2006/0158901 A1* | 7/2006 | Wang | 362/612 |
| 2006/0285356 A1* | 12/2006 | Tseng | 362/608 |
| 2007/0007558 A1 | 1/2007 | Mazzochette | |
| 2007/0158674 A1 | 7/2007 | Taguchi et al. | |
| 2007/0189007 A1 | 8/2007 | Nishimoto et al. | |

FOREIGN PATENT DOCUMENTS

WO    WO-2006/132174 A1    12/2006

\* cited by examiner

--PRIOR ART--

--PRIOR ART--

With optical coupler

Without optical coupler

DISPLAY BACKLIGHT WITH IMPROVED LIGHT COUPLING AND MIXING

CROSS REFERENCE TO RELATED APPLICATION

This application claims the benefit of U.S. Provisional Application Ser. No. 60/694,740, filed on Jun. 28, 2005. The entire disclosure of U.S. Provisional Application Ser. No. 60/694,740 is incorporated by reference herein.

FIELD OF THE INVENTION

The present invention relates to a display backlight assembly providing improved coupling and color mixing. More specifically, the present invention relates to a device providing improved coupling and mixing of multi-colored and mono-chromatic light produced by one or more solid state light sources, such as, for example, light emitting diodes (LEDs), such as a resonant cavity light emitting diodes (RCLEDs), super luminescent light emitting diodes (SLEDs), or organic LEDs.

BACKGROUND OF THE INVENTION

Display technology used in many television and computer applications typically uses a backlight panel or plate for illumination of a display, particularly a liquid crystal display (LCD). For example, LCD displays are commonly used in such exemplary applications as notebook computer displays, computer monitors, wireless cell phones, and flat-panel televisions. The display backlight generally includes a planar light guide configured to spread light from a light source located at an edge or edges of the light guide across the surface of the display.

FIG. 1 depicts a conventional display backlight arrangement including a cold-cathode compact fluorescent light (CCFL) source. As shown in FIG. 1, the light produced by the CCFL propagates into the edges of the light guide. The light is internally reflected until it reaches the reflective surface on the bottom of the light guide. After striking the reflective surface, some of the light reflects up and out of the light guide. However, not all of the light that enters the light guide from the edges is emitted uniformly from the light guide surface that is opposite the reflector.

As such, conventional CCFL display backlight assemblies, such as the one shown in FIG. 1, are limited by a number of drawbacks. For example, these assemblies are typically fragile and contain environmentally hazardous material, such as mercury. Furthermore, conventional CCFL display backlight assemblies fail to produce a full spectrum of light. In addition, the assemblies cannot be rapidly switched to reduce frame jitter.

Disadvantageously, many typical display backlight assemblies include a physical gap between the CCFL and the light guide. Generally, the physical gap is maintained between the two elements because the fluorescent tubes are very thin and fragile (e.g., a 19-inch LCD display includes tubes that are approximately ⅛ of an inch in diameter), and highly susceptible to damage if placed in physical contact with the light guide. Due to the physical gap, however, the emitted light is not efficiently coupled from the CCFL into the light guide.

Like the example shown in FIG. 1, many conventional display backlight assemblies are edge lit, meaning that the fluorescent tubes are arranged at the edge of the light guide, as opposed to behind the light guide. By positioning the tubes along the edges of the light guide, a thinner display may be produced. However, displays that are edge lit by fluorescent tubes do not project a large range of quality light, thereby limiting the overall size of the display that may be produced using an edge-lit arrangement.

Finally, in general, conventional compact fluorescent light provides a poor color rendition, particularly with respect to the color red and the like. Thin-film transistor (TFT) LCDs have been developed to address the poor color rendition provided by compact fluorescent tubes. These LCDs typically include one or more TFT filters designed to take the white light produced by the CCFL and filter it into red, green, and blue pixels. Next, the TFT corresponding to each of those pixels turns on, off, or partially on to create a single pixel consisting of a combination of the three colors. However, as much as 75% or more of the white light emitted by the CCFL may be lost in the TFT filters.

Accordingly, there is a need in the art for a display backlight assembly that provides improved coupling and color mixing using an edge-lit arrangement.

SUMMARY OF THE INVENTION

The present invention relates to an edge-lit display backlight assembly that improves the coupling and mixing of multi-colored and/or mono-chromatic light produced by a solid state light source. According to an embodiment of the present invention, the display backlight assembly includes a display optical light guide (DOLG) and a solid state light source (SSLS) coupled together by an optical coupler. As used herein, the term "display optical light guide" or "DOLG" is intended to include an optical light guide for use as a backlight to illuminate a visual display, particularly those in computer, television, and cell phone applications. Advantageously, coupling the SSLS to the DOLG eliminates the air gap typically existing between the two elements and provides improved management of the light emitted by the SSLS.

According to the present invention, the optical coupler may include, but is not limited to, an optical index matching gel, an optical index matching gasket, a tapered pre-collimation light guide, a shaped pre-collimation light guide, or an inverse-tapered light guide pre-mixer. Alternatively, the optical coupler may comprise a DOLG panel with one or more of its edges shaped to mate with at least a portion of the SSLS. The optical coupler may be made of cured acrylic resin, cured silicone, or other suitable material for matching indices of refraction.

The edge-lit display backlight assembly according to the present invention provides improved resolution, color rendition, light extraction, and illumination efficiency as compared to conventional TFT-LCD displays, without the need for filters, thus reducing the cost and thickness of the display, and eliminating the light loss associated with the filters.

The SSLS according to an embodiment of the present invention may include one or more multi-colored LEDs. According to an exemplary embodiment, the SSLS includes a plurality of red, green, and blue LEDs arranged in an array, herein referred to as a RGB array. Optionally, the SSLS may include a reflector to direct and manage the light emitted by the RGB array. According to another embodiment of the present invention, an improved color gamut may be provided by using a multi-color LED array including, but not limited to, red, blue, green, amber, and cyan LEDs. One having ordinary skill in the art will appreciate that any combination of LEDs may be used in the multi-color LED array. According to an embodiment of the present invention, the multi-color LED array may be arranged in a slotted cavity composed of a reflective material.

According to an embodiment of the present invention, the SSLS may include any suitable variety of LED, including, but not limited to a resonant cavity light emitting diode (RCLED), a super luminescent light emitting diodes (SLED), or an organic LED emitting diode.

In addition, the optical coupler may provide for improved color mixing. For example, the optical coupler may include a light dispersing/mixing element, such as, for example a plurality of micro-prisms, capable of efficiently mixing the light emitted by the multi-colored LED array of the SSLS. Such micro-prism dispersers may be composed of glass, acrylic, cured silicone, or other transparent material with suitable index of refraction. Other color uniformity enhancement features can also be incorporated into a reflective coupler by faceting the active surfaces and tuning each of these facets by a multi-order polynomial, aspheric deformation, or Bezier curve. A Bezier curve has control points and weighting factors which can be varied to deform the facet and guide the light accordingly.

BRIEF DESCRIPTION OF THE DRAWINGS

The present invention will be more readily understood from the detailed description of preferred embodiments presented below considered in conjunction with the attached drawings, of which.

DETAILED DESCRIPTION OF THE INVENTION

Figure 1A:
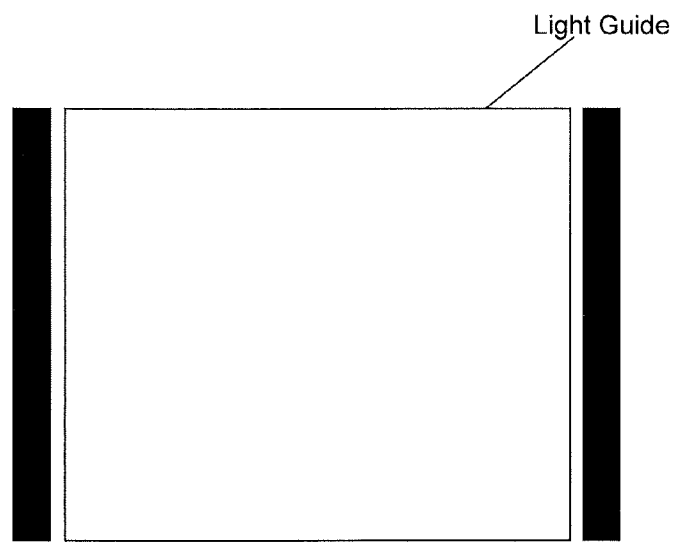
FIG. 1A and FIG. 1B, collectively referred to herein as FIG. 1, show a front and top view of a conventional display backlight with a cold-cathode compact fluorescent light source.
Figure 1B:
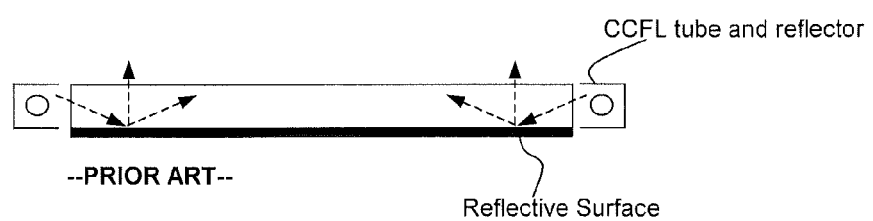
Figure 2A:
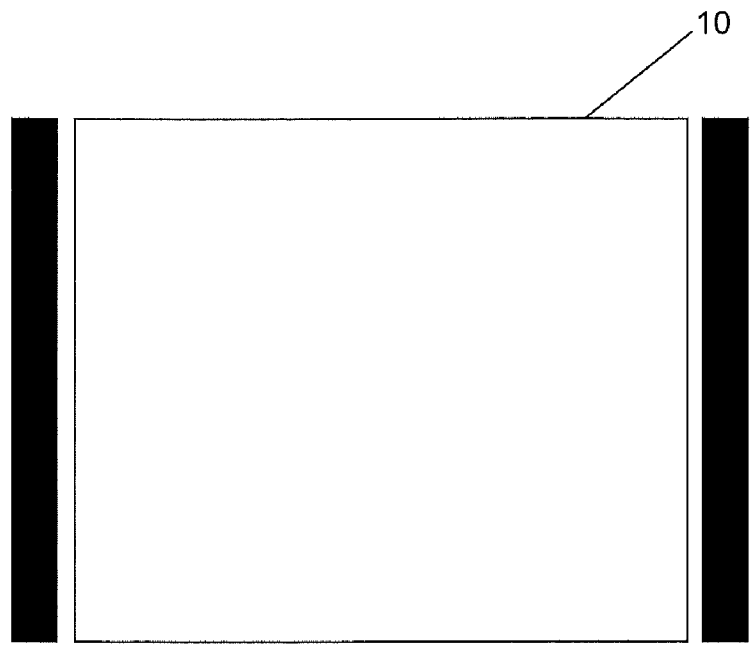
FIG. 2A and FIG. 2B, collectively referred to herein as FIG. 2, illustrate a front and top view of a display backlight assembly including a multi-color solid state light source, according to an embodiment of the present invention.
Figure 2B:
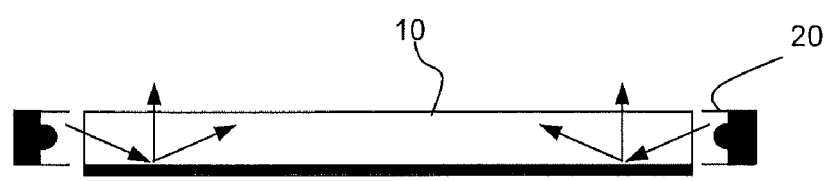

FIG. 2 shows an exemplary display backlight assembly using a solid state light source (SSLS) 20, according to an embodiment of the present invention. The SSLS 20 according to the embodiment shown in FIG. 2 may include any suitable solid state light source, such as, for example, light emitting diodes (LEDs), solid state lasers, or other suitable semi-conductor-based light source. Furthermore, the SSLS 20 may include one or more resonant cavity light emitting diodes (RCLED), one or more super luminescent light emitting diodes (SLEDs), or one or more organic LEDs. One having ordinary skill in the art will appreciate that the SSLS 20 may include multiple devices (i.e., multiple LEDs) and may include devices that emit light at multiple wavelengths (i.e., a multi-colored array of LEDs). For example, a LED-based SSLS 20 may include an array of red LEDs (labeled as "R" in FIGS. 3-6), green LEDs (labeled as "G" in FIGS. 3-6), and blue LEDs (labeled as "B" in FIGS. 3-6).

Figure 3:
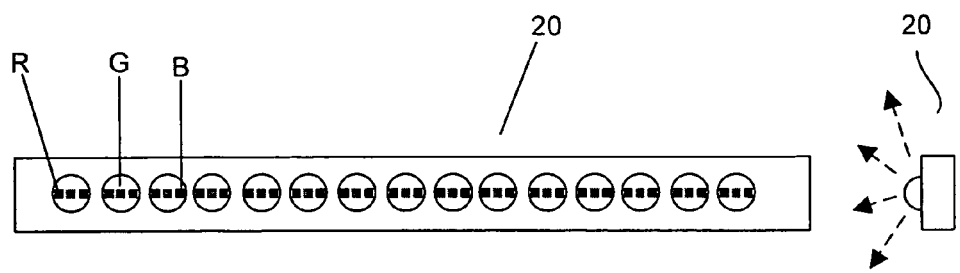
FIG. 3 shows a top and side view of a multi-color LED-based solid state light source (SSLS), according to an embodiment of the present invention.
Figure 4:
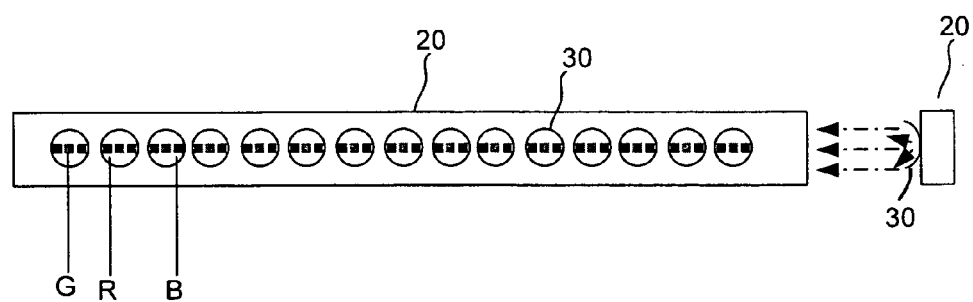
FIG. 4 shows a top and side view of a multi-color LED-based solid state light source with a reflector, according to an embodiment of the present invention.
Figure 5:
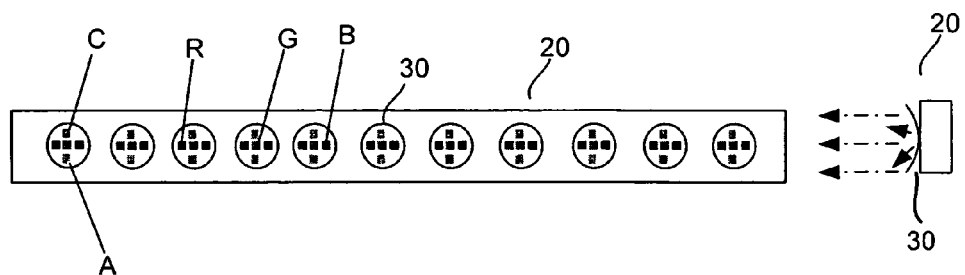
FIG. 5 shows a top and side view of a multi-color LED-based solid state light source with improved color gamut, according to an embodiment of the present invention.

FIG. 3 shows a detailed construction of a red, green, blue LED-based SSLS 20 which includes a plurality of RGB LEDs, according to an embodiment of the present invention. As shown in FIG. 3, the separate red, green, and blue LED die are tightly packed (i.e., the spacing between the LED die can be between 1-10,000 microns) to form a RGB array exhibiting a substantially uniform distribution of light. FIG. 4 depicts a RGB array SSLS 20 according to an embodiment of the present invention, which includes an optical reflector 30 for directing the emitted light toward the DOLG 10.

According to another embodiment of the present invention, an improved color gamut may be provided by using a multi-color LED array including, but not limited to, red, blue, green, amber, and cyan LEDs. One having ordinary skill in the art will appreciate that any combination of colors may be used in the multi-color LED array. According to an embodiment of the present invention, the multi-color LED array includes red, green, and blue LEDs. According to another embodiment of the present invention, shown in FIG. 5 includes red, green, blue, amber and cyan LEDs.

Figure 6:
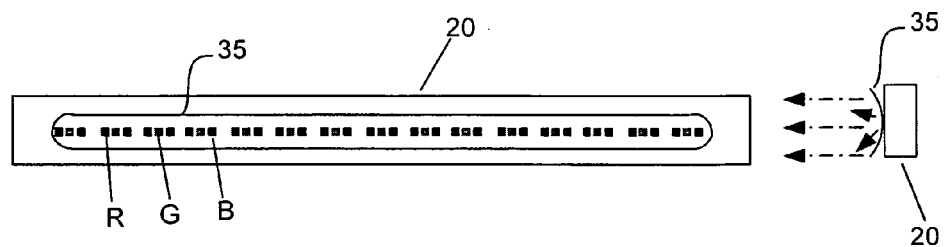
FIG. 6 shows a top and side view of a multi-color LED-based solid state light source with a slotted reflector cavity, according to an embodiment of the present invention.

FIG. 6 shows an exemplary embodiment of the present invention wherein the multi-color LEDs are arranged in a slotted cavity 35 in the SSLS 20. The slotted cavity may be coated or formed from highly reflective materials such as aluminum, highly reflective Teflon™ or MgO paint. The geometry of the slot efficiently focuses or directs the wide angular distribution of the light emitting from the solid state light sources into the DOLG 10, through a larger area with narrower light divergence, thus improving its overall luminance.

Figure 7:
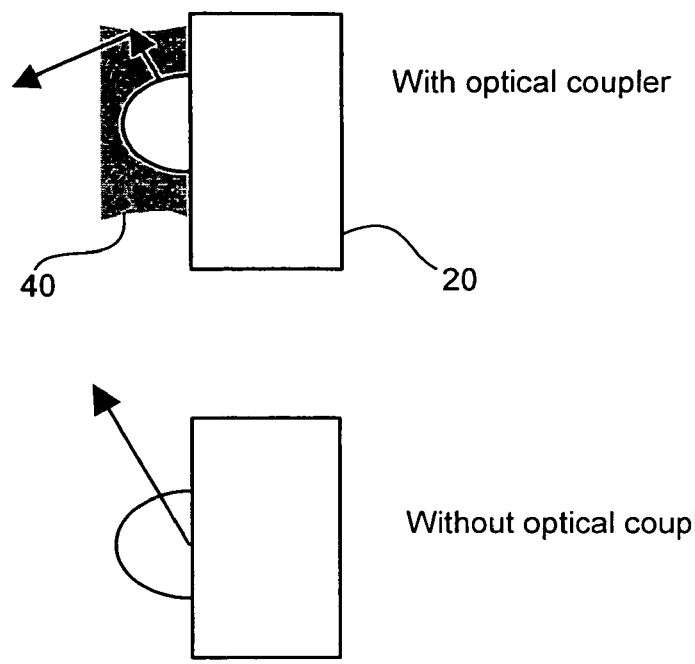
FIG. 7 depicts a SSLS with and without an optical coupler, according to an embodiment of the present invention.

As shown in FIG. 7, the light emitted by the SSLS 20 is more effectively directed into the one or more edges of the DOLG 10 (not shown in FIG. 7) by coupling the SSLS 20 and the DOLG 10 together using one or more optical couplers 40. The optical coupler 40 guides more light into the DOLG 10, resulting in a significant increase in the illumination of the DOLG 10 (e.g., approximately a 50-60% increase). The optical coupling of the SSLS-to-DOLG interface reduces the amount of light that is lost by frustrated total internal reflection. The optical coupler 40 also reduces the total internal reflection (TIR) absorption loss within and around the SSLS 20. One having ordinary skill in the art will appreciate that the DOLG 10 may be composed of any suitable material, such as, for example, acrylic.

In addition, the optical coupler 40 also reduces the light lost due to back-reflections between the SSLS 20 and the DOLG 10 (i.e., the loss due to fresnel reflection loss). One having ordinary skill in the art will appreciate that the fresnel reflection loss at normal incidence is approximated by the following expression:

$$((n_t - n_i)/(n_t + n_i))^2$$

where $n_t$ is the index of refraction of the transmitting medium, and
where $n_i$ is the index of refraction of the incident medium or layer.

As such, in a conventional arrangement, the DOLG/air interface and the light source/air interface, where the index of air is approximately 1, and the index of the DOLG 10 is approximately 1.5, each produce approximately 4% reflectance loss. According to an embodiment of the present invention, light that meets the TIR condition at the optical coupler 40 is directed back into the DOLG 10, rather than escaping into the air.

According to an embodiment of the present invention, the DOLG 10 and SSLS 20 may be optically coupled together using one or more optical couplers 40, such as, for example: an optical index matching gel, a tapered pre-collimation light guide (with and without stepped reflectors), a shaped pre-collimation light guide, or an inverse tapered light guide pre-mixer. Alternatively, any of these embodiments of optical couplers may further comprise one or more micro-prisms or other light dispersers.

Figure 7A:
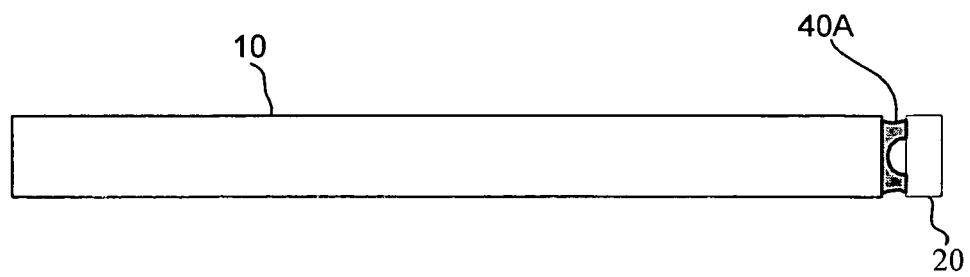
FIGS. 7a-7g show examples of SSLS to DOLG coupling, according to embodiments of the present invention.

FIG. 7a shows an exemplary display backlight assembly according to an embodiment of the present invention, wherein the SSLS 20 is optically coupled to one or more edges of the DOLG 10 using an optical index matching gel 40A, typically a silicone compound. One having ordinary skill in the art will appreciate that any suitable optical index matching gel may be used in accordance with the present invention, including but not limited to, Metrotek 61180, Thorlabs G608N, Nusil LS-3249, and Nye OCF-452. Optionally, the optical index matching gel 40A may have an adjustable index of refraction. The adjustable index gel is composed of a host material, such as, for example, polysiloxane (silcone), and a dopant material. The dopant material may be any suitable material used to increase the mean index of refraction of the gel, such as, for example, a diphenyl or other compound. According to an embodiment of the present invention, the index of the gel-to-lightguide interface may be represented as a mean index, wherein:

$$n_{gel} = [n_{hostmaterial} + n_{dopantmaterial}]^{.5}.$$

For example, polysiloxanes (silicones) have an index of refraction of 1.40 at 25° C. at a wavelength of 589 nm. Introducing diphenyldimethyl materials into the polysiloxanes produce higher index of refraction copolymers, which may be used to form index bridges and thus reduce fresnel backreflection losses.

Figure 7B:
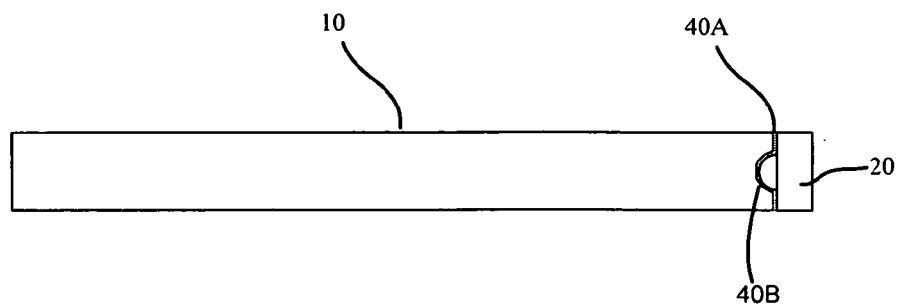

FIG. 7b depicts an exemplary display backlight assembly according to an embodiment of the present invention, wherein the DOLG 10 includes one or more pre-formed contoured edges 40B shaped to mate with at least a portion of the SSLS 20. For example, if an LED-based SSLS 20 is used, the pre-formed contour may be shaped in a substantially hemispheric manner to securely fit at least a top portion of the LEDs. Optionally, an optical index matching gel 40A may be provided at the interface of the contoured edge 40B and the SSLS 20.

Figure 7C:
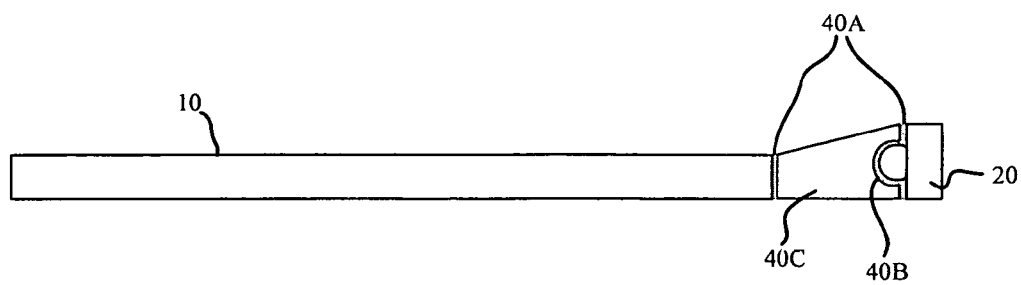

FIG. 7c shows an exemplary display backlight assembly according to an embodiment of the present invention, wherein a tapered pre-collimation light guide 40C is disposed between the DOLG 10 and the SSLS 20. As shown in the FIG. 7c, the tapered pre-collimation light guide 40C may include a contoured edge shaped to mate with at least a portion of the SSLS 20. Optionally, an optical index matching gel may be used at the interface between the SSLS 20 and the tapered pre-collimation light guide 40C and/or the interface between the DOLG 10 and the tapered pre-collimation light guide 40C. The tapered pre-collimation light guide 40C provides for the redirection of light in an angular distribution that may be easily accepted by the DOLG 10. Advantageously, the tapered pre-collimation light guide 40C improves optical coupling by matching the numerical aperture (NA) of the DOLG 10, without significantly increasing etendue. One having ordinary skill in the art will appreciate that the tapered pre-collimation light guide 40C may be composed of any suitable material, including, but not limited to, cured acrylic resin or cured silicone.

According to an embodiment of the present invention, the efficiency (η) of the light transferred from the SSLS 20 to the DOLG 10 may be approximated by the following transfer efficiency components: η(geometrical); η(fresnel); and η(angular), wherein η(geometrical) equates to the geometrical loss factor contributing to coupling efficiency; η(fresnel) equates to the fresnel backreflection loss(es); and η(angular) equates to the angular distribution and acceptance mismatch losses.

The overall transfer efficiency from the SSLS 20 to the DOLG 10, denoted as 'P,' may be expressed as follows:

$$P(SSLS)_{transferred} = \eta(\text{geometrical}) * \eta(\text{fresnel}) * \eta(\text{angular})$$

where η(geometrical)=area of the DOLG (lightguide) aperture/area of the SSLS (lightsource),
where η(fresnel)=1−R; and
where R is the percentage of light backreflected into the optical coupler, as represented by the following expression:

$$R = ((n_{lightguide} - n_{coupler})^2)/((n_{lightguide} + n_{coupler})^2) \times 100\%.$$

Significant fresnel losses are introduced when the index of refraction (n) of the optical coupler 40 ($n_{coupler}$) is equal to the index of refraction of air, such that:

$$R = ((n_{lightguide} - 1)^2/(n_{lightguide} + 1)^2 \times 100\%$$

wherein orthogonal incidence by the incoming light is assumed. Light bundles which are off-axis from the normal experience more back reflection loss, and accordingly:

$$R' = ((n_{lightguide} * \cos(\theta_i) - n_{coupler} * \cos(\theta_t))/(n_{lightguide} * \cos(\theta_i) + n_{coupler} * \cos(\theta_t))) \text{ and}$$

$$\eta(\text{angular}) = 1 - (\cos(\theta_{lightguide}))^{m+1}$$

where $\theta_i$ represents the incident angle of light propagation with respect to the surface normal,
where $\theta_t$ represents the transmitted angle of light propagation,
where $\theta_{lightguide} = \arcsin(NA)$,
where m is dependent on the angular distribution of the source, and defined by the following expression:

$$m = (\log(0.5))/(\log(\cos(\theta_{FWHM})/2)); \text{ and}$$

where FWHM is the full width at half maximum angle.

Light accepted by the DOLG 10 must have a distribution cosine less than the critical angle of the DOLG 10 in order for total internal reflection to occur. As such, $\theta_{FWHM}$ is the angle at which the intensity of the SSLS 20 drops to 50%. For example, for a lambertian-type SSLS 20, the angular distribution of the SSLS 20 is near 120° and m=1. Accordingly, it is advantageous to reduce η(angular) through collimation lenses or shaped light guide couplers (described below). Furthermore, collimators may be used as efficient angle-to-area converters, including, for example, collimators of several different geometric configurations, such as tapered cones, parabolas, confocal parabolic concentrators, and confocal elliptical concentrators.

Optionally, as shown in FIG. 7c, an edge of the tapered pre-collimation light guide 40C may be contoured to mate with and securely fit at least a portion of the SSLS 20.

Furthermore, the tapered pre-collimation light guide 40C provides for improved brightness uniformity at the edges of the DOLG 10. In addition, the tapered pre-collimation light guide 40C increases the useable uniform area of the DOLG 10 for display purposes. For example, in a typical RGB arrangement, the tapered pre-collimation light guide 40C provides efficient color mixing and decreases banding artifacts caused by non-uniform incidences on the dispersing peening arrangement, prisms, holographic elements, or other dispersing means typically used in conventional liquid crystal display (LCD) light guide panels. Advantageously, the angle, length, surface roughness, microstructure, material, index of refraction and/or other characteristics of the tapered pre-collimation light guide 40C may be optimized for specific applications and improved light guide performance.

Figure 7D:
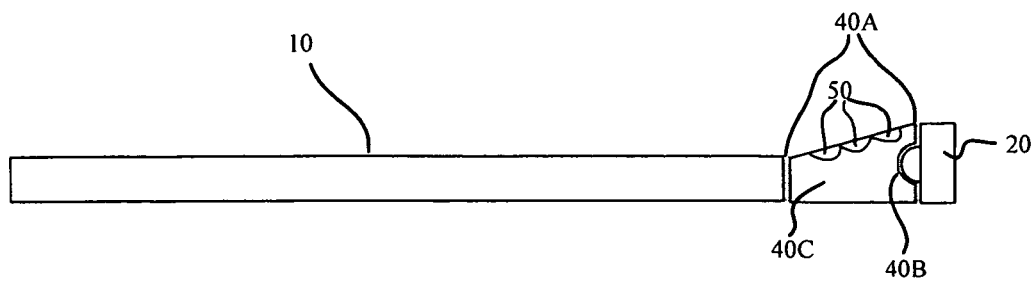

According to an embodiment of the present invention, as shown in FIG. 7d, one or more stepped reflectors 50 (e.g., micro-prisms) may be arranged on the top and/or bottom internal sides of the tapered pre-collimation light guide 40C to improve the color mixing of the SSLS 20 and to provide improved uniformity at the active edge of the DOLG 10. One having ordinary skill in the art will appreciate that the stepped reflectors 50 may be formed according to a variety of known methods, including, but not limited to, thick layer photo-resist fabrication or precision electroforming using a mold. One having ordinary skill will further appreciate that other suitable methods may be employed to refine the pitch, trough tolerance, and/or angular precision of the reflectors 50.

Figure 7E:
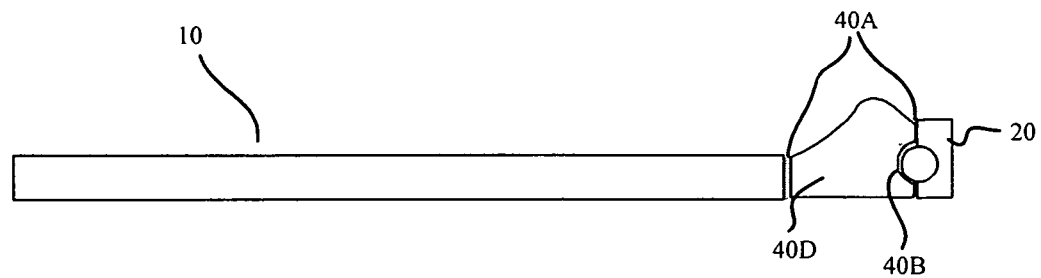

FIG. 7e illustrates another exemplary display backlight assembly according to the present invention. According to this embodiment of the present invention, the assembly includes a shaped (i.e., a non-linear taper) pre-collimation light guide 40D having a higher order active Bezier or aspheric polynomial. The shaped pre-collimation light guide 40D provides color mixing, uniformity, and flux transfer efficiency for the light passing from the SSLS 20 to the DOLG 10, and may be composed of any suitable material, such as cured acrylic resin or cured silicone. According to an embodiment of the present invention, a shaped pre-collimation light guide 40D may be in the form of a Bezier, or non-uniform Bezier spline, to allow more control over the angular distribution of the source. A non-uniform Bezier curve includes control points described through cartesian coordinates in x, y and z, or by an additional weighting parameter w (i.e., the order of the curve), and a knot vector for mapping from parametric space to object space, as represented by the following equation:

$$C(u) = \frac{1}{\sum\limits_{i=0}^{n} N_{i,p}(u)w_i} \sum\limits_{i=0}^{n} N_{i,p}(u)w_i P_i$$

where $C(u)$ represents a Bezier curve where u is a parametric parameter,
where i represents a Bezier curve of order equal to 0,
where n represents the Bezier curve order,
where $w_i$ represents a control point weighting parameter,
where $P_i$ represents a control point number, and
where $N_{i,p}(u)$ represents a normalized basis function.
Accordingly, the curve forms within the bounding control point polygon or complex hull, as follows:

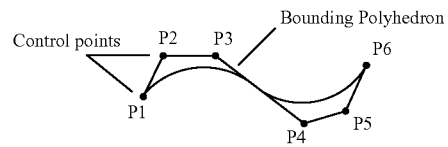

When the shaped pre-collimation light guide 40D is formed using either a 2D Bezier (i.e., a non-uniform rational Bezier spline or a 3D non-uniform rational Bezier spline surface, the light can be guided in such a manner that collimation and directionality are introduced into the beam, as well as controlled randomization of primary color concentrations.

According to an embodiment of the present invention, the non-uniform Bezier spline surface may be represented by the following expression:

$$S(u, v) = \frac{\sum\limits_{i=0}^{m}\sum\limits_{j=0}^{n} N_{i,p}(u)N_{j,q}(v)w_{i,j}P_{i,j}}{\sum\limits_{i=0}^{m}\sum\limits_{j=0}^{n} N_{i,p}(u)N_{j,q}(v)w_{i,j}}$$

where $S(u,v)$ represents a non-uniform surface with u,v parametric spatial variables,
where $N_{i,p}$ represents a Bezier spline basis function in a first direction,
where $N_{j,q}$ represents a Bezier spline basis function in a second direction,
where $P_{i,j}$ represent the control points,
where $W_{i,j}$ represents the control point weight parameters,
where m represents the last Bezier order in the first direction, and
where n represents the last Bezier order in the second direction.

Assuming perfect light propagation (i.e., without dispersion from the SSLS 20), the DOLG 10 is illuminated by color specific squares spaced accordingly, and the light is propagated from one side of the DOLG 10 to the other without dispersion or redirection to a vertical direction (i.e., a direction from which the corresponding panel is illuminated). According to an embodiment of the present invention, the control points and weighting knot vectors may be manipulated to provide a high degree of collimation and directionality in the vertical direction with wide dispersion in the horizontal direction to improve color uniformity.

According to an embodiment of the present invention, in the vertical direction, the Bezier splines are shaped to approximate a confocal parabolic concentrator to efficiently collimate light from the SSLS 20 (e.g., solid state lambertian emitters). Optionally, shaped pre-collimation light guide 40D arranged as Bezier splines may also include perturbations in the control points to increase randomization of the primary light directional propagation. In the horizontal direction the splines take on general forms which disperse light through negative prescriptions and may include local geometric structures to form enhanced skew rays which cross paths with those of alternate color, such that the net effect at the entrance aperture of the DOLG 10 is a white light or a homogeneously randomized multi primary.

Further, the shaped pre-collimation light guide 40D may include contoured edges adapted to mate with the SSLS 20, as described above and shown in FIG. 7e. Optionally, as shown in FIG. 7e, an optical index matching gel 40A may be used to provide additional optical coupling between the interface of the SSLS 20 and the shaped pre-collimation light guide 40D and/or the interface of the DOLG 10 and the shaped pre-collimation light guide 40D. Optionally, the shaped pre-collimation light guide 40D may include one or more stepped reflectors 50, similar to those described above with respect to FIG. 7d.

Figure 7F:
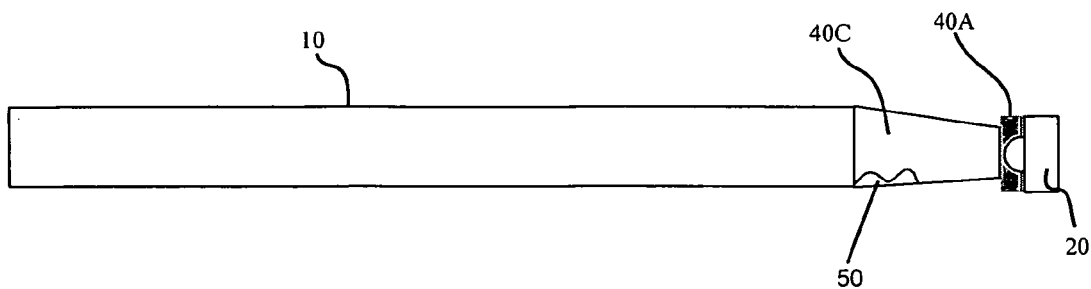

FIG. 7f illustrates an embodiment of the present invention wherein the DOLG 10 and the SSLS 20 are coupled by an inverse-tapered light guide pre-mixer 40E. As shown, the inverse-tapered light guide pre-mixer 40E is arranged such that the narrow-end of the taper is coupled to the SSLS 20 and the wide-end of the taper coupled to the DOLG 10. One having ordinary skill in the art will appreciate that the inverse-tapered light guide pre-mixer 40E may be composed of any suitable material, such as, for example, cured acrylic resin or cured silicone. The inverse-tapered light guide 40E provides improved coupling efficiency between the SSLS 20 and the DOLG 10. Advantageously, the inverse-tapered light guide 40E improves the overall brightness of the backlight by further improving conversion of angular distribution into area illumination. For example, for an inverse-tapered light guide 40E (e.g., cone-shaped light guide) having a semi-angle (A) capable of accepting a maximum input angle (B), the incident light propagates into the inverse-tapered light guide 40E according to the following expression:

$$2*(A)=(PI/2)-B$$

where PI represents the ratio of the circumference and the diameter of an angular circle.

Optionally, the inverse-tapered light guide pre-mixer 40E may include micro-prisms. According to another option, the inverse-tapered light guide 40E may include one or more stepped reflectors 50 on either the upper or lower surface of the inverse-tapered light guide 40E to redirect light propagation paths to homogenously illuminate the DOLG 10 aperture. Optionally, an optical index matching gel 40A may be used to provide additional optical coupling between the interface of the SSLS 20 and the inverse-tapered light guide pre-mixer 40E and/or the interface of the DOLG 10 and the inverse-tapered light guide pre-mixer 40E.

Figure 7G:
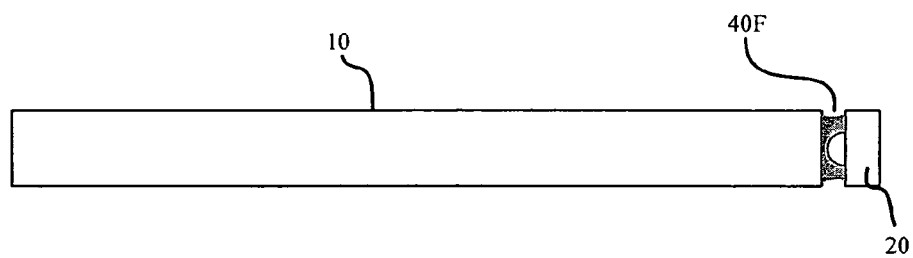

FIG. 7g shows an exemplary display backlight assembly according to the present invention including an optical index matching gasket 40F which optically couples the DOLG 10 and the SSLS 20. The optical index matching gasket 40F may be composed of any suitable transparent material, such as, for example, silicone, optically transparent rubber, or other suitable low durometer material. According to an embodiment of the present invention, the optical index matching gasket 40F is composed of a molded silicone material, preferably a mean index matched silicone gel cured through a platinum catalyzed addition cure, tin condensation, oxime, or peroxide cure. For example, a platinum complex cure may be used to generate to form a reaction between the hydride and vinyl groups of the silicone, thereby forming an ethyl bridge. The silicone, when cured, becomes a compliant, transparent bridge between the optical aperture geometry of the SSLS 20 and the DOLG 10. Optionally, both the optical index matching gasket 40F and an optical index matching gel 40A may be used to couple the interface of the DOLG 10 and the SSLS 20. The optical index matching gasket may be shaped to mate with the SSLS 20 and form a light-guiding extension of the DOLG 10. Optionally, the optical index matching gasket 40F may be removable.

Figure 7H:
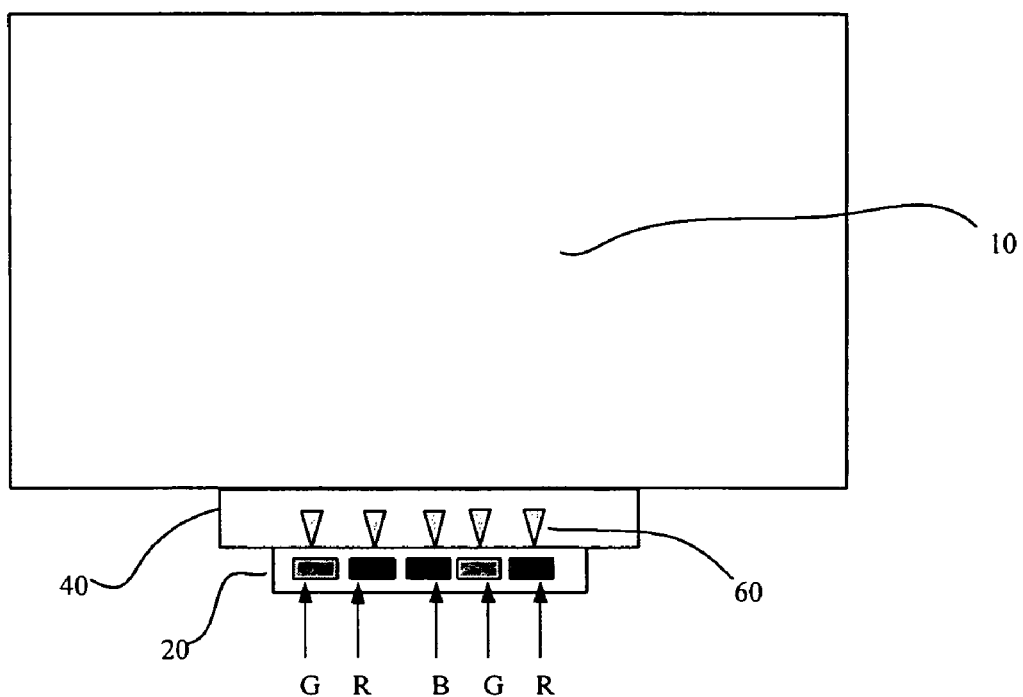
FIG. 7h shows an optical light guide, according to an embodiment of the present invention.

FIG. 7h depicts an exemplary display backlight assembly according to an embodiment of the present invention wherein the optical coupler 40 (e.g., an optical index matching gel 40A or optical index matching gasket 40F) includes one or more micro-prism dispersers 60 disposed therein. Preferably, the one or more micro-prism dispersers 60 have a slightly lower or slightly higher index of refraction relative to the optical coupler 40 (or optical index matching gasket 40F).

According to an embodiment of the present invention, microprism light dispersants of slightly different refractive index than the host material perturb the direction cosines of incoming light rays. These micro-site light refraction effects can be approximated by a Mie scattering model in which the degree of light path deviation is denoted as (s*r') where (s) is the scattering vector and (r') is either the radius or largest aspect parameter of the imbedded micro dispersant, and induce light direction perturbation according to the following expression:

$$s=2*k*\sin(\theta/2)$$

where k is the wavevector influenced by index difference and wavelength, and
where θ is the angle of perturbation induced by refraction and the dissimilar dielectric interface boundary shape. The refractive index ratio $m=n_{particle}/n_{host}=1+mu$, where mu is preferably between 0.005 and 0.025 to achieve high light transfer efficiency with improved color uniformity. The deviation angle induced by the micro-site scatter is approximated by delta=$2*[\sin^{-1(h/r')}-\sin^{-1[h/r'*(1+mu)]}]$, where (h) is the distance from the normal incident ray passing through the center of the micro-dispersant particle and the actual raypath passing through a chord section of the micro-dispersant. Optionally, the optical coupler 40 is composed of an immersion refractive index gel or clear silicone gasket material.

The micro-prism dispersers 60 re-orient the color-specific light cones emitted from the LED dies to further integrate the combined color contribution of the one or more LED die (labeled R, G, and B in FIG. 7h) of the SSLS 20. These three-dimensional pyramidal prisms may shape the light into a fan-like distribution or a two-dimensional intensity spread. Advantageously, the micro-prisms dispersers 60 improve lateral mixing between the individual RGB light sources, while still maintaining the light intensity distributions within the acceptance NA of the DOLG 10.

One having ordinary skill in the art will appreciate that with multi-colored LED configurations, a certain color integration length is required to achieve a relatively uniform solid color resulting from the mixture of colors emitted by the multi-colored LEDs, such as, for example, white light. According to an embodiment of the present invention, the micro-prism dispersers 60 are included in the optical coupler 40 to decrease the integration length required. The optical coupler 40 according to this embodiment of the present invention may be an optical index matching gel 40A, a tapered pre-collimation light guide 40C, a shaped pre-collimation light guide 40D, an inverse-tapered light guide pre-mixer 40E, or an optical index matching gasket 40F. One having ordinary skill in the art will appreciate that the optical couplers may be composed of acrylic, a transparent optical silicone gasket, or other suitable index matching gel material.

Figure 8:
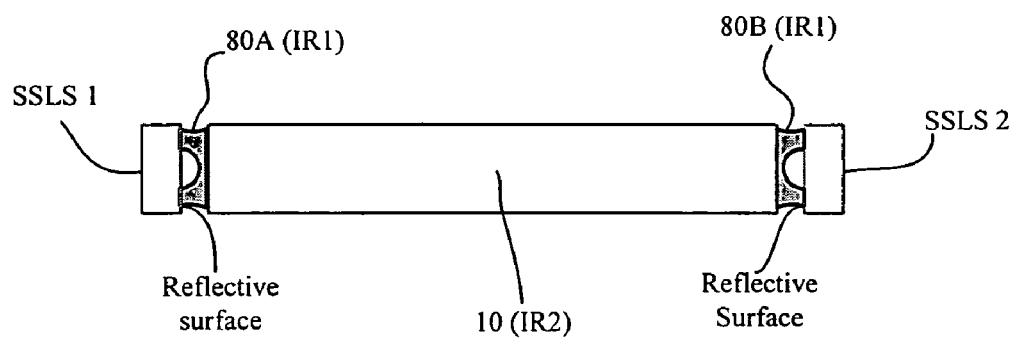
FIG. 8 depicts a DOLG illuminated from two sides using a SSLS with total internal reflection (TIR) index matching and reflective surfaces, according to an embodiment of the present invention.

FIG. 8 shows an exemplary display backlight assembly according to an embodiment of the present invention including a DOLG 10 illuminated with two SSLSs, referred to as SSLS 1 and SSLS 2. Although shown with two SSLSs, one having ordinary skill in the art will appreciate that any number of SSLSs may be used in accordance with this embodiment of the invention. According to this embodiment of the present invention, SSLS 1 and SSLS 2 are each optically coupled to the DOLG 10 by respective optical couplers 80A, 80B.

According to this embodiment, the light emitted by SSLS 1 and SSLS 2 passes through optical couplers 80A, 80B and illuminates the DOLG 10. However, some of the light may be lost if it is emitted by SSLS 1, couples through the DOLG 10, and is absorbed by SSLS 2, and/or vice versa. To prevent the light loss associated with this absorption, the index of refraction of the optical coupler 40 (labeled as IR1 in FIG. 8) is greater than the index of refraction of the DOLG 10 (labeled as IR2 in FIG. 8). Optionally, as shown in FIG. 8, the SSLSs (SSLS 1 and/or SSLS 2) may each include a reflective surface to reflect the light emitted by the opposing SSLS. As light recycles through the DOLG 10 it may encounter multiple intersections with a dielectric/air interface in a traditional backlight lightguide coupler. With each passage of the light through this interface, attenuation occurs which decreases the luminance of the backlight. Light which passes the lightguide-to-coupler interface must reflect efficiently to allow for re-entry into the light guide. According to an embodiment of the present invention, a reflective surface, such as highly reflective silver, aluminum, or reflective polymers (e.g., the Amodal™ polymers manufactured by Solvay Advanced Polymers) may surround the emitter in the form of a conformly designed primary reflector.

It is to be understood that the exemplary embodiments are merely illustrative of the present invention and that many variations of the above-described embodiments can be devised by one skilled in the art without departing from the scope of the invention. It is therefore intended that all such variations be included within the scope of the invention.

What is claimed is:

1. A display backlight assembly comprising:
   a display optical light guide including a first edge and an opposing second edge;
   an optical coupler proximate the first edge of the display optical light guide, wherein the optical coupler has an index of refraction greater than an index of refraction of the display optical light guide, wherein the optical coupler includes a plurality of micro-prism dispersers at least partially embedded therein, and wherein continuous regions of the optical coupler extend between adjacent micro-prism dispersers;
   a solid state light source proximate the optical coupler and coupled to the first edge of the optical light guide by the optical coupler, wherein the solid slate light source comprises a plurality of individual solid state light sources, and wherein each solid state light source of the plurality of solid state light sources is arranged in approximate alignment with a single micro-prism disperser of the plurality of micro-prism dispersers; and
   a reflective surface disposed at an interface between the solid state light source and the optical coupler to allow for re-entry of light traveling in a direction generally from the second edge to the first edge back into the light guide.

2. The display backlight assembly of claim 1, wherein the optical coupler comprises an optical index matching gel.

3. The display backlight assembly of claim 1, wherein the optical coupler comprises the edge of the display optical light guide shaped to mate with at least a portion of the solid state light source.

4. The display backlight assembly of claim 1, wherein the optical coupler comprises a tapered pre-collimation light guide.

5. The display backlight assembly of claim 4, wherein the tapered pre-collimation light guide has an index of refraction approximately equal to the index of refraction of the display optical light guide.

6. The display backlight assembly of claim 4, wherein the tapered pre-collimation light guide comprises acrylic.

7. The display backlight assembly of claim 4, wherein an optical index matching gel is disposed at an interface of the display optical light guide and the tapered pre-collimation light guide and at an interface of the solid state light source and the tapered pre-collimation light guide.

8. The display backlight assembly of claim 4, wherein the tapered pre-collimation light guide includes one or more stepped reflectors.

9. The display backlight assembly of claim 4, wherein the tapered pre-collimation light guide includes one or more micro-prism dispersers.

10. The display backlight assembly of claim 9, wherein the tapered pre-collimation light guide is composed of a material having a higher index of refraction than the micro-prism dispersers.

11. The display backlight assembly of claim 9, wherein, the tapered pre-collimation light guide is composed of a material having a lower index of refraction than the micro-prism dispersers.

12. The display backlight assembly of claim 1, wherein the optical coupler comprises a non-linear taper pre-collimation light guide.

13. The display backlight assembly of claim 12, wherein the non-linear taper pre-collimation light guide has an index of refraction approximately equal to the index of refraction of the display optical light guide.

14. The display backlight assembly of claim 12, wherein the non-linear taper pre-collimation light guide comprises acrylic.

15. The display backlight assembly of claim 12, wherein an optical index matching gel is disposed at an interface of the display optical light guide and the shaped pre-collimation light guide and at an interface of the solid state light source and the non-linear taper pre-collimation light guide.

16. The display backlight assembly of claim 12, wherein the non-linear taper pre-collimation light guide includes one or more micro-prism dispersers.

17. The display backlight assembly of claim 16, wherein the non-linear taper pre-collimation light guide is composed of a material having a higher index of refraction than the micro-prism dispersers.

18. The display backlight assembly of claim 17, wherein the non-linear taper pre-collimation light guide is composed of a material having a lower index of refraction than the micro-prism dispersers.

19. The display backlight assembly of claim 12, wherein the non-linear taper pre-collimation light guide is shaped to approximate a confocal parabolic concentrator.

20. The display backlight assembly of claim 12, wherein the non-linear taper pre-collimation light guide comprises a non-uniform Bezier spline surface.

21. The display backlight assembly of claim 20, wherein the non-linear Bezier spline surface comprises perturbations to increase randomization of light propagation.

22. The display backlight assembly of claim 12, wherein the non-linear taper pre-collimation light guide is shaped to approximate a confocal elliptical concentrator.

23. The display backlight assembly of claim 1, wherein the optical coupler comprises an inverse-tapered light guide pre-mixer.

24. The display backlight assembly of claim 23, wherein an optical index matching gel is disposed at an interface of the display optical light guide and the inverse-tapered light guide pre-mixer and at an interface of the solid state light source and the inverse-tapered light guide pre-mixer.

25. The display backlight assembly of claim 23, wherein the inverse-tapered light guide pre-mixer includes one or more micro-prism dispersers.

26. The display backlight assembly of claim 25, wherein the inverse-tapered light guide pre-mixer is composed of a material having a higher index of refraction than the micro-prism dispersers.

27. The display backlight assembly of claim 25, wherein the inverse-tapered light guide pre-mixer is composed of a material having a lower index of refraction than the micro-prism dispersers.

28. The display backlight assembly of claim 1, wherein the optical coupler comprises an optical index matching gasket.

29. The display backlight assembly of claim 28, wherein the optical index matching gasket comprises silicone.

30. The display backlight assembly of claim 28, wherein the optical index matching gasket includes one or more micro-prism dispersers embedded therein.

31. The display backlight assembly of claim 30, wherein the optical index matching gasket is composed of a material having a higher index of refraction than the micro-prism dispersers.

32. The display backlight assembly of claim 30, wherein the optical index matching gasket is composed of a material having a lower index of refraction than the micro-prism dispersers.

33. The display backlight assembly of claim 28, wherein the optical index matching gasket is removable.

34. The display backlight assembly of claim 1, wherein the solid state light source comprises a light emitting diode (LED) array.

35. The display backlight assembly of claim 34, wherein the LED array comprises LEDs of at least two different colors.

36. The display backlight assembly of claim 35, wherein the LED array comprises one or more of red, green, cyan, amber and blue LEDs.

37. The display backlight assembly of claim 1, wherein the solid state light source comprises a reflector.

38. The display backlight assembly of claim 1, wherein the solid state light source comprises an array of LEDs disposed in a slotted cavity.

39. The display backlight assembly of claim 38, wherein the slotted cavity comprises a reflective surface.

40. The display backlight assembly of claim 39, wherein the reflective surface comprises a metal film, a metal paint, or a highly reflective polymer.

41. The display backlight assembly of claim 1, wherein the reflective surface is conformly disposed on the solid state light source.

42. The display backlight assembly of claim 1, wherein indices of refraction of the micro-prism dispersers are each greater than the index of refraction of the optical coupler.

43. The display backlight assembly of claim 1, wherein indices of refraction of the micro-prism dispersers are each lower than the index of refraction of the optical coupler.

44. The display backlight assembly of claim 1, wherein at least one micro-prism disperser has an index of refraction greater than the index of refraction of the optical coupler, and wherein at least one micro-prism disperser has an index of refraction lower than the index of refraction of the optical coupler.

45. A display backlight assembly comprising:
a display optical light guide comprising a first edge and an opposing second edge;
a first solid state light source coupled to the first edge of the display optical light guide by a first optical coupler, wherein the first optical coupler has an index of refraction greater than that of the display optical light guide; and
a second solid state light source coupled to the second edge of the display optical light guide by a second optical coupler, wherein the second optical coupler has an index of refraction greater than that of the display optical light guide;
wherein at least one of the first solid state light source and the second solid state light source has a reflective surface disposed at an interface between the respective light source and the associated optical coupler to allow for re-entry of light traveling toward the interface from within the light guide back into the light guide; and
wherein,
the first solid state light source and the second solid state light source comprise a plurality of individual solid state light sources,
the first optical coupler and the second optical coupler include a plurality of micro-prism dispersers embedded therein,
continuous regions of the optical coupler extend between adjacent micro-prism dispersers, and
each micro-prism disperser of the plurality of micro-prism dispersers of each of the first and second optical couplers is arranged in approximate alignment with a single solid state light source of the plurality of solid state light sources of each of the first and second solid state light sources.

46. The display backlight assembly of claim 45, wherein the first and second solid state light sources include opposing reflective surfaces.

47. The display backlight assembly of claim 46, wherein the reflective surfaces comprise a metal film, a metal paint, or a highly reflective polymer.

48. The display backlight assembly of claim 45, wherein the first optical coupler comprises an optical index matching gel.

49. The display backlight assembly of claim 45, wherein the first optical coupler comprises an optical index matching gasket.

50. The display backlight assembly of claim 45, wherein the first optical coupler comprises a tapered pre-collimation light guide.

51. The display backlight assembly of claim 45, wherein the first optical coupler comprises a non-linear taper pre-collimation light guide.

52. The display backlight assembly of claim 45, wherein the first optical coupler comprises an inverse-tapered light guide pre-mixer.

53. The display backlight assembly of claim 45, wherein the first optical coupler comprises silicone.

54. The display backlight assembly of claim 45, wherein an optical index matching gel is disposed at respective interfaces of the first optical coupler, the display optical light guide, and the first solid state light source.

55. The display backlight assembly of claim 45, wherein the reflective surface is conformly disposed on the respective solid state light source.

56. The display backlight assembly of claim 45, wherein indices of refraction of the micro-prism dispersers are each greater than the index of refraction of the optical coupler.

57. The display backlight assembly of claim 45, wherein indices of refraction of the micro-prism dispersers are each lower than the index of refraction of the optical coupler.

58. The display backlight assembly of claim 45, wherein at least one micro-prism disperser has an index of refraction greater than the index of refraction of the optical coupler, and wherein at least one micro-prism disperser has an index of refraction lower than the index of refraction of the optical coupler.

* * * * *